US011561739B1

(12) United States Patent
Marino

(10) Patent No.: US 11,561,739 B1
(45) Date of Patent: Jan. 24, 2023

(54) CATASTROPHIC EVENT MEMORY BACKUP SYSTEM

(71) Applicant: SMART Modular Technologies, Inc., Newark, CA (US)

(72) Inventor: Kelvin Alberto Marino, Laguna Hills, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 48 days.

(21) Appl. No.: 16/889,729

(22) Filed: Jun. 1, 2020

(51) Int. Cl.
*G06F 3/06* (2006.01)
*G06F 1/30* (2006.01)
*G06F 11/14* (2006.01)

(52) U.S. Cl.
CPC ............... *G06F 3/068* (2013.01); *G06F 1/30* (2013.01); *G06F 11/1446* (2013.01)

(58) Field of Classification Search
CPC ............ G06F 11/1446; G06F 11/1456; G06F 11/1458; G06F 11/1471; G06F 3/0619; G06F 3/068; G06F 3/0685; G06F 1/30; G11C 5/141; G11C 14/00; G11C 14/009; G11C 14/0018; G11C 14/0027; G11C 14/0036; G11C 14/0045
See application file for complete search history.

(56) References Cited

U.S. PATENT DOCUMENTS

| 6,336,174 | B1 * | 1/2002 | Li ................... G06F 11/1441 365/228 |
| 7,139,937 | B1 * | 11/2006 | Kilbourne ............. G11C 11/406 714/47.2 |
| 2006/0015683 | A1 * | 1/2006 | Ashmore ............ G06F 11/1441 711/113 |
| 2006/0136765 | A1 * | 6/2006 | Poisner ............... G06F 11/1441 713/323 |
| 2009/0031072 | A1 * | 1/2009 | Sartore ................... G06F 1/305 711/102 |
| 2009/0031099 | A1 * | 1/2009 | Sartore .................. G11C 5/144 711/162 |
| 2010/0205470 | A1 * | 8/2010 | Moshayedi ............ G11C 5/141 713/340 |
| 2015/0081958 | A1 * | 3/2015 | Li ............................ G06F 1/30 711/103 |
| 2015/0287461 | A1 * | 10/2015 | Song ................... G11C 14/0018 365/185.08 |
| 2017/0262344 | A1 * | 9/2017 | Shaw .................... G06F 3/0653 |
| 2017/0277464 | A1 * | 9/2017 | Yoon ................... G06F 11/1441 |
| 2018/0232307 | A1 * | 8/2018 | Oota .................... G06F 11/3037 |

* cited by examiner

*Primary Examiner* — Gabriel Chu
(74) *Attorney, Agent, or Firm* — Withrow & Terranova, P.L.L.C.

(57) ABSTRACT

A persistent memory unit for a computer system where the memory unit can detect a catastrophic event and automatically backup volatile memory into non-volatile memory. The memory unit can operate with a limited number of power inputs and detect the loss of power and then initiate a backup after the volatile memory of the memory unit has entered a stable self-refresh mode. The memory unit uses an on-board power management interface controller capable of redistributing power from an input power line and generating different power levels for different components on the memory unit.

19 Claims, 5 Drawing Sheets

CATASTROPHIC EVENT MEMORY BACKUP SYSTEM

TECHNICAL FIELD

Embodiments relate generally to computer systems, and, more specifically, to a computer system with a memory unit having a catastrophic event backup system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern high-speed computing involves certain operations of computer system that are performed by transferring data elements from a data storage sub-system and into main memory for processing by one or more processors. The data can vary between individual scaler values and large data arrays having very large numbers of individual elements. As compute systems increase in data capacity and computer power, larger volumes of data need to be processed in a given unit of time.

Computer system data can be retained for short or long periods of time. Dynamic and intermediate data can have a lifespan of nanoseconds, while stored data may be maintained for many years. Each type of data has individualized data access, storage, and preservation requirements that vary based on the purpose of the data.

Computer data centers also grow to accommodate the increasing amount of computer and networking equipment. Modern data centers consume large amounts of electrical power for the operation of the computer equipment and for the environmental cooling required to cool the equipment.

The requirements of fast and secure computer systems and their associated data and storage systems are constantly evolving. These computer systems must constantly evolve to accommodate the ever increase needs of modern computing applications. Computing power, local memory speed, storage capacity, data transfer rates, and power requirements grow without limit and require innovative solutions to satisfy the demands of modern computer systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
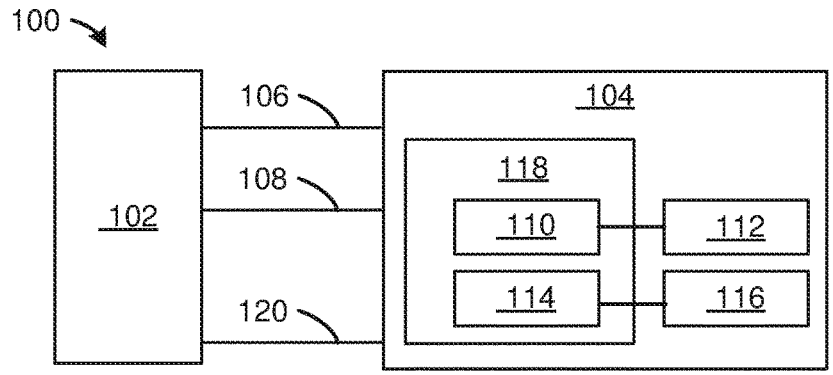
FIG. 1 depicts a view of a computer system in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0. General Overview
2.0. Structural Overview
3.0. Implementation Mechanism—Hardware Overview
3.1. Hybrid Memory Unit
3.2. Power Management Unit
3.3. Registering Clock Driver
4.0. Functional Overview
5.0. Example Embodiments
6.0. Extensions and Alternatives

1.0. GENERAL OVERVIEW

Approaches, techniques, and mechanisms are disclosed for manufacturing and operating a computer system with a memory controller. The computer system with the memory-controller can store and retrieve data from a variety of memory elements. The system can be dynamically reconfigured to increase performance and capacity.

Modern computer systems are configured with operational memory typically use dual inline memory modules (DIMM). The operational memory can be used by processors units to store and retrieve data quickly in byte-oriented random-access memory. The operation memory is often implemented using various types of dynamic random-access memory (DRAM).

Modern computer systems require ever increasing amount of operational memory operating an ever-increasing speed. The DRAM memory modules increase in both speed and capacity over time. The dynamic random-access memory is typically coupled to a processor on a motherboard having a memory bus with an address lines grouped into an address bus and data lines grouped into a data bus. The memory bus can also include lines for commands, control and timing signals.

The number of information lines in the memory bus can be limited due to physical constraints. Because the size of the accessible memory is increasing, more addressing lines are required to address the data. Additional, new paradigms for memory operation can increase the number of command and control lines. As performance and capacity requirement increase, the memory modules must be optimized for power consumption, speed, connectivity, redundancy, and memory capacity.

According to one embodiment, the system can comprise a hybrid memory module having both volatile memory and non-volatile memory. Upon detection of a catastrophic event, such as a loss of power, the hybrid memory module can independently initiate a memory backup operation between the volatile memory and the non-volatile memory.

According to another embodiment, the system can comprise a hybrid memory module providing persistent memory functionality. The system can detect the operational state of the volatile memory and when the volatile memory is in a safe state, the system can initiate one or more operations to preserve the volatile memory.

According to another embodiment, the system can include on-board power management units of the memory module configured to receive one or two power inputs from a module interface and then provide various power levels to different components. The simplified power interface on the module interface can reduce the complexity of the motherboard of an external host system by reducing the number of components required on the motherboard to provide power for different configurations of the main memory.

According to another embodiment, the hybrid memory module can comprise volatile memory, non-volatile memory, a registering clock driver, a temperature sensor, a power management integrated circuit, a logic unit, and a controller. The controller can include a volatile memory controller and a non-volatile memory controller.

In other aspects, the invention encompasses computer apparatuses and computer-readable media configured to carry out the foregoing techniques.

2.0. STRUCTURAL OVERVIEW

FIG. 1 illustrates a view of a computer system 100 in an embodiment. The single computer system 100 shows a processor 102 coupled to a memory module 104.

The processor 102 can be coupled to the memory module 104 via a host controller 130. The host controller 130 is a device for communicating with the memory module 104.

The host controller 130 can be coupled to one or more bus interfaces including a memory bus 106. The memory bus 106 is an electrical interface between the host controller 130 and the memory module 104.

The memory bus 106 can have a variety of configurations. For example, the memory bus 106 can include data lines 120, address lines 122, command lines 124, signal lines 126, power lines 128, and other similar elements. The processor 102 can send data and commands to the memory module 104 via the memory bus 106.

The memory module 104 can be a hybrid memory having volatile memory 116 and non-volatile memory 112. The memory module 104 can include a memory controller 118. The memory controller 118 can include a volatile memory controller 114 and a non-volatile memory controller 110.

Although the memory controller 118 is shown as including the volatile memory controller 114 and a non-volatile memory controller 110, it is understood that other configurations are possible. For example, the volatile memory controller 114 and a non-volatile memory controller 110 can be separate components, either controller can be integrated into the memory controller 118, or the memory controller 118 can perform the functionality of either or both controllers.

The volatile memory controller 114 can be coupled to the volatile memory 116. The volatile memory controller 114 is a device for managing and controlling the volatile memory 116. For example, the volatile memory controller 114 send commands to the volatile memory 116 to read and write data.

The memory module 104 can provide persistent memory services by allowing both the volatile memory 116 and the non-volatile memory 112 to be used for the persistent storage of data. The memory module 104 can implement persistence in a variety of ways. The hybrid memory can employ different persistence mechanisms including backup of the volatile memory to non-volatile memory, file storage in non-volatile memory, or a combination thereof.

The computer system 100 provide power to the memory module 104 using the power lines 128 of the memory bus 106. The power lines 128 can be configured in a variety of ways. In an illustrative example, the power lines 128 can be configured to provide multiple individual operating voltages for the memory controller 118, volatile memory controller 114, the volatile memory 116, the non-volatile memory controller 110, the non-volatile memory 112, and other similar components.

This can require that the computer system 100 be configured to provide the different voltage levels for the total number of the memory modules 104 that can be coupled to the computer system 100. This can require designing enough capacity into the computer system 100 to handle the maximum number of the memory modules 104, regardless of how many are currently or usually coupled to the system.

3.0. IMPLEMENTATION MECHANISM—HARDWARE OVERVIEW

3.1. Hybrid Memory Unit

Figure 2:
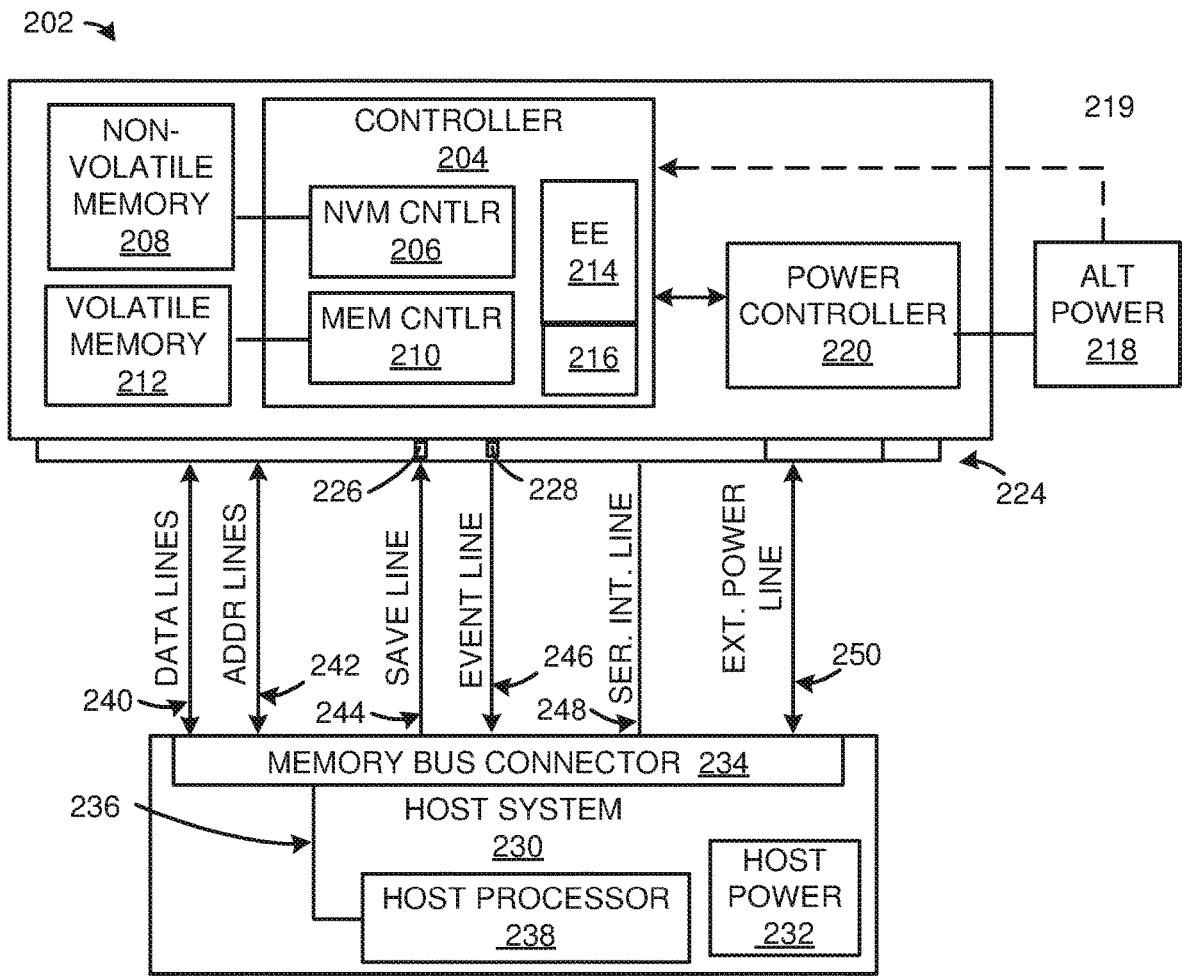
FIG. 2 depicts an example of a hybrid memory unit in another embodiment.

FIG. 2 illustrates an example of the hybrid memory unit 202 in another embodiment. The hybrid memory unit 202 can include a volatile memory 212 coupled with a non-volatile memory 208 to provide a persistent memory system.

The hybrid memory unit 202 is a memory providing electronic storage for a host system 230. The hybrid memory unit 202 can provide a variety of memory storage services including providing access to the volatile memory 212, providing backup from the volatile memory 212 to the non-volatile memory 208, providing automatic backup support in case of a catastrophic event or command, or similar memory storage services.

The hybrid memory unit 202 can include a controller 204 having a non-volatile memory controller 206 and a volatile memory controller 210. The controller 204 can operate the hybrid memory unit 202 in combination with the non-volatile memory controller 206 and the volatile memory controller 210. The hybrid memory unit 202 can include software and firmware, both not shown, that can execute on the different controllers to perform the operation of the hybrid memory unit 202.

The non-volatile memory controller 206 can be coupled to the non-volatile memory 208. The non-volatile memory 208 are data storage devices that retain their contents when the power is removed. For example, the non-volatile memory 208 can include Flash memory, magnetic memory, resistive memory, optical memory, charged coupled devices, phase change memory, or other similar memory.

The volatile memory 212 are memory that do not retain their contents when the power is removed. For example, the volatile memory 212 can be dynamic random-access memory, synchronous dynamic random-access memory, static random-access memory, or other similar memory.

The hybrid memory unit 202 can include an encryption engine 214. The encryption engine 214 is an electrical device to encrypt and decrypt data as it is transferred between the memory and the host system 230. The encryption engine 214 can encrypt and decrypt the data in the volatile memory 212 before and after transfer to the non-volatile memory 208. Having the encryption engine 214 on the hybrid memory unit 202 can increase security by preventing unauthorized access to the data.

The hybrid memory unit 202 can include a power controller 220. The power controller 220 is an on-board power management device for converting electrical input voltage levels to other voltage levels. The power controller 220 can be a power management integrated circuit, a power management interface controller, or other type of power management device.

The power controller 220 can simplify the design of both the host system 230 and the hybrid memory unit 202 by streamlining the number of power inputs required for the different internal subsystems of the hybrid memory unit 202. For example, the power controller 220 can operate with a minimum number of power inputs, such as a single 12 volt line, an additional 3.3 volt line, or a combination thereof. The power controller 220 can use the input power to generate different voltage levels on the hybrid memory unit 202 to provide the proper voltage levels to operate the various components.

Optionally, the hybrid memory unit 202 can include an alternative power source 218. The alternative power source 218 can be coupled to the power controller 220 in a variety of ways. For example, the alternative power source 218 can be directly on the hybrid memory unit 202, tethered to the hybrid memory unit 202 by a power cable, be directly on the hybrid memory unit 202 and kept charged with a tethered power cable, or a combination thereof.

The alternative power source 218 can be a battery, a supercapacitor, an external power connection, or a similar power device. The alternative power source 218 can be coupled to the power controller 220 and to the controller 204. In one embodiment, the hybrid memory unit 202 can include an external trigger 219 for communicating between alternative power source 218 and the controller 204.

The alternative power source 218 can be physically sized to fit on to the hybrid memory unit 202. In another embodiment, the alternative power source 218 can be electrically sized to have sufficient capacity to power the hybrid memory unit 202 long enough to back up the volatile memory 212 to the non-volatile memory 208.

The hybrid memory unit 202 can be coupled to the host system 230. The host system 230 can be a host computer, server, portable system, or other computer system using memory.

The host system 230 can include a host processor 238. The host processor 238 is a computing device controlling the host system 230. For example, the host processor 238 can be a microprocessor, a controller, a central processing unit, or other similar device.

The host system 230 can include a memory bus connector 234 coupled to the host processor 238 by a memory bus 236. The memory bus 236 is an electrical element for transferring data and control information between memory and the host processor 238.

The memory bus connector 234 is an electromechanical element for attaching the memory to the host system 230. For example, the memory bus connector 234 can be a DIMM connector, a DDR3 connector, a DDR4 connector, a DDR5 connector, a DDR4/5 differential DIMM (DDIMM), a USB connector, or a similar device.

The host system 230 can include a host power unit 232. The host power unit 232 can provide electrical power to the host system 230 and the associated subcomponents. The host power unit 232 can be coupled to the hybrid memory unit 202 via the memory bus connector 234.

The hybrid memory unit 202 can be coupled to the memory bus connector 234 with contact pins 224. The contact pins 224 can support an interface between the memory and a host controller. The contact pins 224 are electrical contacts attached to the hybrid memory unit 202. The contact pins 224 can carry data and command signals to support data transfer.

The hybrid memory unit 202 can have a variety of configurations. For example, one embodiment of the hybrid memory unit 202 can have the contact pins 224 including data lines 240, address lines 242, an event line 246, a serial interface line 248, and an external power line 250.

In an embodiment, the contact pins 224 can include a save line 244. The save line 244 can be coupled to a save_n pin 226 included on the contact pins 224. However, in other embodiments, the save_n pin 226 can be excluded from the configuration to reduce the number of pins in use.

The event line 246 can be coupled to an event_n pin 228 on the contact pins 224.

The data lines 240 can transfer data information between the hybrid memory unit 202 and the memory bus connector 234. The address lines 242 can transfer command information and signals. The address lines 242 can include address and command information.

The save line 244 can be a line used to transfer a save signal. The save signal can be used by the hybrid memory unit 202 to initiate a save operation.

The event line 246 can be a line used to indicate that an event has occurred by transferring an event signal. The event signal can be used to trigger a predefined response for the event.

The event line 246 can be used to send asynchronous notification for events on the hybrid memory unit 202 to the host system 230. In one embodiment, the hybrid memory unit 202 can send the event signal to the host which can then read a register on the hybrid memory unit 202 to determine the appropriate response.

The serial interface line 248 is a line used for serial communication with the hybrid memory unit 202. The serial interface line 248 can be used to transfer status information, commands, parameters, or other similar data. The serial interface line 248 can utilize a single data line for bidirectional data flow. In a different configuration, the serial interface line 248 can support one directional data flow. The serial interface line 248 can be associated with additional communication lines as needed.

The serial interface line 248 can have a variety of configurations. For example, in one embodiment, the serial interface line 248 can be an inter-integrated circuit interface (I2C interface), a system management bus (SMBus), I3C protocol, protocol or other serial bus protocols. In another configuration, the serial interface line 248 can be implemented using multidrop serial buses such as the Mobile Industry Processor Interface (MIPI) SenseWire, I2C lite, or other similar interfaces. The hybrid memory unit 202 can support command formats including J2C commands, commands, Serial Peripheral Interface protocol, I3C light protocol, SMBus commands, and other similar command protocols.

The hybrid memory unit 202 can include serial line module 216. The serial line module 216 is a device for supporting serial communication and data processing over the serial interface line 248. The serial line module 216 can include serial registers that can store status, configuration, and control information.

The hybrid memory unit 202 can include an external power line 250. The external power line 250 is an electrical conductor providing operating power from the host power unit 232. The external power line 250 can be coupled with the power controller 220 to provide power to the hybrid memory unit 202.

The power controller 220, such as a PMIC, can convert the voltage level of the input power to provide multiple voltage levels for different components on the hybrid memory unit 202. For example, the volatile memory 212

Figure 3:
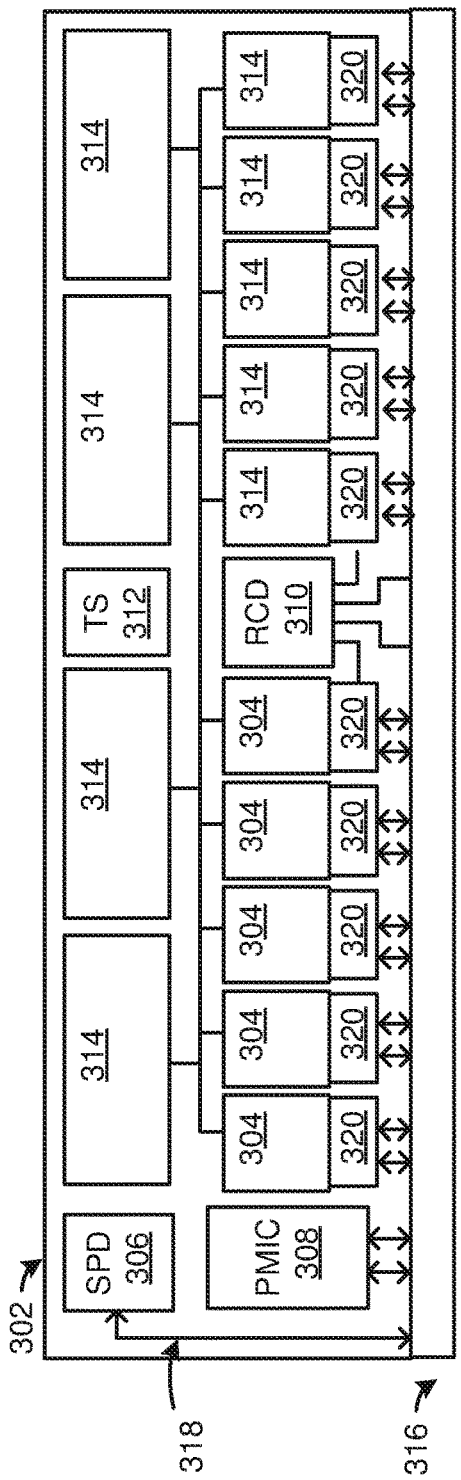
FIG. 3 depicts an example of a hybrid memory unit in yet another embodiment.

FIG. 3 illustrates an example of a hybrid memory unit 302 in another embodiment. The hybrid memory unit 302 can provide persistent memory functionality using volatile memory 304 and non-volatile memory 314.

The hybrid memory unit 302 can include the volatile memory 304 coupled to the memory bus 316 through data buffers 320. For example, the volatile memory 304 can be dynamic random-access memory (DRAM) chips, static random-access memory chips, synchronous dynamic random-access memory (SDRAM), or similar memory. The computer system 100 can be coupled to the volatile memory 304.

The hybrid memory unit 302 can include non-volatile memory 314 coupled to the volatile memory 304. The non-volatile memory 314 are memory circuits that can preserve their contents even when not receiving power. For example, the non-volatile memory 314 can be Flash memory, magnetic memory, resistive memory, optical memory, charged coupled devices, phase change memory, or other similar memory storage devices.

The non-volatile memory 314 can be coupled to the volatile memory 304 via an internal bus 322. The internal bus 322 provides a data communication path for transferring data between the volatile memory 304 and the non-volatile memory 314. The internal bus 322 can be configured to have a low-power operational mode to be used when transferring the data during a power failure on the hybrid memory unit 302.

The hybrid memory unit 302 can include a power management unit 308, such as a power management integrated circuit (PMIC) or power management interface controller. The power management unit 308 can receive input power from an external system and provide different voltages to the different components of the hybrid memory unit 302.

The hybrid memory unit 302 can include a serial presence detect device 306 (SPD device 306). The serial presence detect device 306 is a device to access information about a memory. The SPD device 306 can include an Electrically Erasable Programmable Read Only Memory (EEPROM) having parameter information stored in the bottom 128 or 256 bytes of the EEPROM. In an example, the SPD device 306 can be compliant with the EE1004-v and TSE2004av devices defined in the JESD21C specification.

In one example, these parameters can include timing data, latency information, manufacturer information, serial number, security information, and other information about the hybrid memory unit 302. The SPD device 306 can access and send the data to external and internal systems. This can provide the host system with the information needed to utilize the hybrid memory unit 302.

In one embodiment, the SPD device 306 can support module information for a Byte Addressable Energy Backed Interface (BAEBI). The SPD device 306 can include data structures and values required by the BAEBI. These fields can include an SPD Revision field, a Key Byte/Module Type, a Maximum Non-Volatile Memory Initialization Time, a format interface description, and other similar values.

During the catastrophic save operation, the memory controller can flush all of the write through buffers or other platform buffers back to the volatile memory to ensure data consistency. Then the volatile memory devices can be put in the self-refresh mode.

In another illustrative example, the SPD device 306 can be accessed by a serial interface 318. For example, the serial interface 318 can be an I2C serial interface, a system management bus (SMBus) interface, or other similar interface. The SPD device 306 can transfer the information stored in the parameter storage unit (not shown).

In another example, the hybrid memory unit 302 can include a temperature sensor 312. The temperature sensor 312 readings can be used to determine the current performance levels of the hybrid memory unit 302. The temperature sensor 312 data can be accessed using the SPD device 306. In another illustrative example, the temperature sensor 312, the SPD device 306, and a control plane hub (not shown) can be integrated into an SPD hub device to simplify manufacture. For example, the temperature sensor 312 can be used to determine the temperature of a DIMM module and compare against a self-refresh temperature 332 to adjust the self-refresh frequency.

The hybrid memory unit 302 can include a self-refresh temperature 332 for determining the operation mode. The self-refresh temperature 332 specified can have whether the hybrid memory unit 302 is operating in a normal temperature mode or an extended temperature mode. In an illustrative example, the normal temperature mode can be defined as a temperature range between 0 degrees Celsius and 85 degrees Celsius. The extended temperature mode can be defined as a temperature range between 0 degrees Celsius and 95 degrees Celsius.

The hybrid memory unit 302 can operate with a refresh cycle time 336. The refresh cycle time 336 is the amount of delay after a refresh command before an activate command can be accepted by the memory. This parameter is dependent on the memory density and is necessary for proper hardware functionality.

The hybrid memory unit 302 can include a registering clock driver 310 (RCD 310). The RCD 310 is an electronic device for buffering and re-driving command and address lines.

The RCD 310 is a hardware register device that buffers the control signals to increase performance. The RCD 310 can optionally buffer the application data to the memory module in some embodiments. The buffering can add an additional clock cycle and can consume more power, but handles the heavier electrical loads placed on high-speed, high-density memory modules. The extra clock cycle effect is over-shadowed by buffering as it reduces the load on the memory controller as it points to the dedicated registered rather than accessing the DRAM directly.

The hybrid memory unit 302 can have a variety of configurations. For example, the hybrid memory unit 302 can be a buffered memory unit. A buffered memory unit can have an electronic data buffer placed between the memory and the memory controller.

The hybrid memory unit 302 can be implemented in a variety of ways. For example, the hybrid memory unit 302 can be configured as a dual in-line memory module (DIMM), single in-line memory module (SIMM), or other similar devices.

In an example, the hybrid memory unit 302 can be a buffered memory. The buffered memory unit can include a registered buffered memory (RDIMM), a fully buffered DIMM (FB-DIMM), a load reduced MINIM (LR-DIMM), a non-volatile DIMM (NVDIMM), or similar device. The RDIMM can have a data register between the internal memory and the memory bus and the external memory controller. This can reduce the electrical load on the memory controller and allow more memory modules to be attached to a system.

In another example, the FB-DIMM can have the control lines and the data lines buffered and can be configured to performed transfers in a serial manner. Additional logic present on the FB-DIMM can transform serial inputs into parallel signals for driving other memory. The LR-DIMM can buffer both control and data lines while maintaining the parallel characteristic of the data and signals. This can help reduce the electrical load and provide for improved operation of the hybrid memory unit 302.

The hybrid memory unit 302 can include several registers for holding data and status information. For example, the hybrid memory unit 302 can include a RCD control words register, a catastrophic save status register such as a CSAVE_STATUS register, a catastrophic save information register such as a CSAVE_INFO register, a health register such as a MODULE HEALTH register, a command status register such as a NVDIMMCMD_STATUS register and other similar registers.

The hybrid memory unit 302 can include the health register 342. The health register 342 is a data register for holding status information about the hybrid memory unit 302. For example, the health register 342 can include a self-refresh mode value 344, such as a DRAM_NOT_SELF_REFRESH bit. The self-refresh mode value 344 can indicate if the SDRAM of the hybrid memory unit 302 is operating in a self-refresh mode.

The memory bus 316 can include the control lines. The control lines can carry signals to drive the operation of the hybrid memory unit 302.

The control lines can have a variety of configurations. In one embodiment, the control lines can include a clock enable line 338, such as a CKE line. The clock enable line 338 can control how the clock signal is utilized. When the clock enable line 338 is low, the hybrid memory unit 302 can act as if the clock has been stopped. This means that no commands are interpreted, and command latency times do not timeout.

The hybrid memory unit 302 can include command lines. For example, the command lines can include a row address strobe line 352, a column address strobe line 354, and a write enable line 356. The row address strobe line 352, such as a RAS line, can be a command bit that is used to specify and identify a particular command. The column address strobe line 354, such as a CAS line, is also a command bit used to select and identify a command. The write enable line 356, such as a WE line, is also a command bit used to select and identify a command.

The hybrid memory unit 302 can include address lines. The address lines can be used to indicate the location of data to be processed. The combination of the command lines and the data lines can be required to properly define a command and the relate operators.

The hybrid memory unit 302 can support different operations. In an illustrative example, the hybrid memory unit 302 can support a catastrophic save operation 340. The catastrophic save operation 340 can be initiated using different mechanisms. For example, the catastrophic save operation 340 can be started based on a START_CSAVE bit in a functional command register, the SAVE_n pin, the RESET_n pin, or an alternative mechanism.

The hybrid memory unit 302 can put the volatile memory 304 into the self-refresh mode by issuing a self-refresh entry command 348. The volatile memory 304 can exit the self-refresh mode with a self-refresh exit command 350.

The hybrid memory unit 302 can include registers related to the catastrophic save operation. These registers can include a catastrophic save information registers such as CSAVE_INFO. This register can include information such as NVM_Data_Valid, triggered by START_CSAVE, triggered by SAVE_n, triggered by RESET_n, and other similar information. The CSAVE_INFO register provides information regarding the valid SDRAM image saved in the NVM subsystem and the trigger source of the last Catastrophic Save operation, if any.

The hybrid memory unit 302 can also include catastrophic save failure information registers such as CSAVE_FAIL_INFO0 and CSAVE_FAIL_INFO1. The first register, such as CSAVE_FAIL_INFO0, can include information such as VOLTAGE_REGULATOR_FAILED, VDD_LOST, VPP_LOST, VTT_LOST, DRAM_NOT_SELF_REFRESH, CONTROLLER_HARDWARE_ERROR, NVM_CONTROLLER_ERROR, NVM_MEDIA_ERROR, and other similar information.

The second register, such as CSAVE_FAIL_INF01, can include information regarding failed save operations including NOT_ENOUGH_ENERGY_FOR_CSAVE, PARTIAL_DATA_SAVED, SAVE_ABORT, NO_SAVE_N, INSUFFICIENT_SAVE_N, NO_RESET_N, SECURITY_ERROR, and other similar information.

3.2. Power Management Unit

Figure 4:
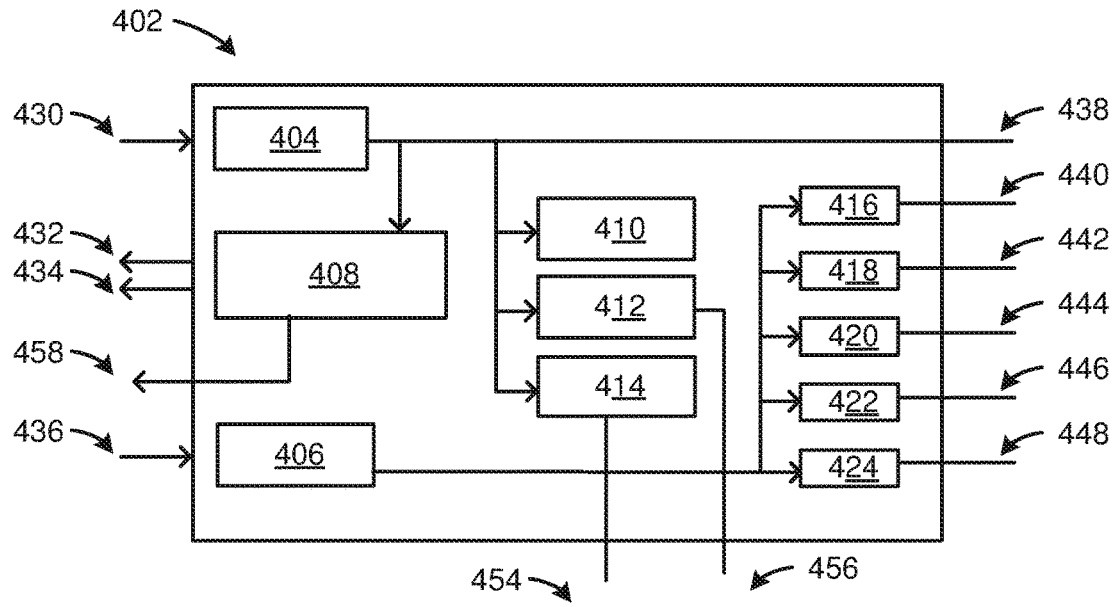
FIG. 4 depicts an example of the power management unit.

FIG. 4 illustrates an example of the power management unit 402. The power management unit 402 is directly on the hybrid memory unit 202 and provides on-board power management functions.

The power management unit 402 is a device for providing different voltage levels for different components on the hybrid memory unit 202. The power management unit 402 can receive input power from one or more sources and generate a larger number of different power outputs. This allows the power management unit 402 to satisfy the power needs of the different components. For example, the power management unit 402 can provide one voltage to the dynamic random-access memory chips of the volatile memory and provide a different voltage to the Flash memory chips of the non-volatile memory.

The power management unit 402 can be implemented in a variety of ways. For example, the power management unit 402 can be a power management integrated circuit, a power management interface controller, a voltage regulator, discrete circuitry, or other similar device.

In one embodiment, the power management unit 402 can include one or more low dropout regulators 404 (LDO 404). The LDO 404 is a device for regulating an output voltage powered based on a input voltage. The LDO 404 can be configured as a linear voltage regulator with little or no switching noise. The LDO 404 can also be configured to have a low quiescent current. The LDO 404 can include 2 outputs.

The PMIC 402 can include a logic control unit 408. The logic control unit 408 can include an analog-to-digital controller, a controller, a microprocessor, a state machine, an oscillator, and additional logic for generating the general status interrupt (GSI) and the power_good signals.

The PMIC 402 can include a local memory unit 410. The local memory unit 410 can be used for storing parameters and other data. The local memory unit 410 can be directly coupled to the LDO 404. The local memory unit 410 can be multiple time programmable memory. In another embodiment, the local memory unit 410 can include one-time programmable memory.

The PMIC 402 can include a I3C unit 412 and the I3C RCD unit 414. The I3C unit 412 can be coupled to the external host system 452. The I3C RCD unit 414 can be coupled to the RCD 450.

The PMIC 402 can have one or more power inputs. The power inputs can include a VIN_Bulk input 436 and a VIN input 430 and other inputs as needed. The power input unit 406 can receive the VIN_Bulk input 436, such as a 12-volt input, from an external host system 452. The VIN input 430 can be directly coupled to the LDO 404 and have a voltage level of 3.3 volts. The VIN input 430 can be used to drive the internal state machine and Read Only Memory devices.

The PMIC 402 can include one or more voltage regulators generating one or more outputs. The outputs can be coupled to the programmable voltage regulators, such as switching regulator A 416 (SWA 416), switching regulator B 418 (SWB 418), switching regulator C 420 (SWC 420), switching regulator D 422 (SWD 422), switching regulator E 424 (SWE 424), and other outputs as needed. The PMIC 402 can output an LDO voltage 438 at 1.8 volts. This can be used to power the serial presence detect device 306, the temperature sensor 312, the RCD 310, and other devices and circuitry.

In an illustrative example, the SWA 416 can output a SWA voltage 440, such as VDD at 1.0 volts. The SWB 418 can output a SWB voltage 442, such as a VDD at 1.0 volts. The SWC 420 can output a SWC voltage 444, such as a VDDQ at 1.1 volts. The SWD 422 can output a SWD voltage 446, such as a VPP at 1.8 volts. And the SWE 424 can output a SWE voltage 448, such as a VDDQ at 1.1 volts.

Although examples are provided for the different voltages, it is understood that other configurations are possible. The switching regulators can have different configurations, different numbers of available output voltages, and different output voltage levels.

For example, the SWA 416 can generate 1.8 volts for powering the SPD, TS, and RCD units. The circuitry for the SPD, TS, and RCD units can be different from that needed by the other components.

The SWB 418 can generate VDD at 1.0 volts. The VDD can be the supply voltage for the input buffer and core logic of the memory chips. The VDD can be the primary power voltage for operating the volatile memory, such as the DRAM memory devices.

The SWC 420 can output VDDQ at 1.1 volts. The VDDQ can be the supply voltage to the input/output buffers of a memory chip. The VDDQ can be the output stage drain power voltage. It can be intended to supply power to the output transistors of the device to drive the load applied to the data output pins or data input/output pins. The VDDQ can be used to power peripheral circuitry of the memory unit. The SWE 424 can also output VDDQ at 1.1 volts.

The SWD 422 can output VPP at 1.8 volts. The VPP can be a supply voltage for a worldline boost for the memory chips. The VPP is a programming power voltage that supplies the potential and energy for altering the state of non-volatile memory arrays. The VPP can also be known as the wordline boot voltage. Alternatively, the VPP can be used as a program enable signal (P). The VPP is a special higher voltage supply that supplies energy for altering the state of non-volatile memory arrays refresh current.

In an embodiment, the SWA 416 and the SWB 418 can be dual phase regulators. The SWC 420 and SWD 422 can be single phase regulators. The optional SWE 424 can be a single-phase regulator.

The hybrid memory unit 302 can include a VSS pin. The VSS pin is the ground reference voltage or the source power voltage pin. VSS can also be designated the ground or GND pin. The VSS pin can be used as the system ground or the reference voltage pin for other device I/O pins. The hybrid memory unit 302 can include a VSSQ pin. The VSSQ pin can be the output stage source power voltage or the output stage ground reference pin.

The PMIC 402 can include programmable output rails. Each of the output rails can be a power output at a specific voltage level. The PMIC 402 can be customized for the appropriate DRAM VDD core and VPP voltage levels. The voltage values are characteristic of the type of DRAM on the DIMM module. The PMIC 402 can provide power for each of the components on the hybrid memory unit 302.

The term rail refers to a single voltage provided by a power supply unit, such as the PMIC 402, power provided on power pins of the memory bus, or other conductors configured to provide operating electrical power to the system. The rail can be a conductor connected to a voltage regulator, a power supply, a battery, an ultra-capacitor, or other power subsystem.

The PMIC 402 can have different states of operation. For example, the PMIC 402 can have a management state with a 3.3-volt input only. Normal operation state can require an input voltage of 10.2 volts to 13.8 volts. The PMIC 402 can include a low power state where the input voltage is between 4.25 volts and 13.8 volts. The PMIC 402 can include a catastrophic save state.

The PMIC 402 can have several outputs. A general status interrupt 432 (GSI_n 432) is a definable interrupt signal that can be generated by the logic unit. A PWR_GOOD signal 434 can also be generated by the logic unit.

The PMIC 402 can be coupled to external systems and components. For example, in one embodiment, PMIC 402 can be in direct communication with an external host system 452. This can be an external CPU or a GPIO on the motherboard.

In another illustrative example, the I3C unit 412 can generate a I3C output 456. The I3C output 456 can be coupled to the external host system 452.

The I3C RCD unit 414 can generate a I3C RCD output 454. The I3C RCD output 454 can be coupled to the RCD 450 on the hybrid memory unit 302.

The PMIC 402 can support direct communication with the RCD 450. This can be supported by providing access via the serial bus and the general status interrupt line (GSI line).

By reducing the number of power input lines to the hybrid memory unit 302, a reduced number of pins are used to convey power. Installing the PMIC 402 on the hybrid memory unit 302 can reduce the complexity of the system and simplify operation. In addition, by using the PMIC 402 in an onboard configuration, the different operating voltages can be provided without the need to make them all available from the external host system.

The PMIC 402 can provide status information regarding the input and output power levels. For example, the PMIC 402 can provide a power status 458 indicating that the input power from the external host system is operating properly. If the external power fails, then the power status 458 can be set to a value indicating that there is a power problem.

3.3. Registering Clock Driver

Figure 5:
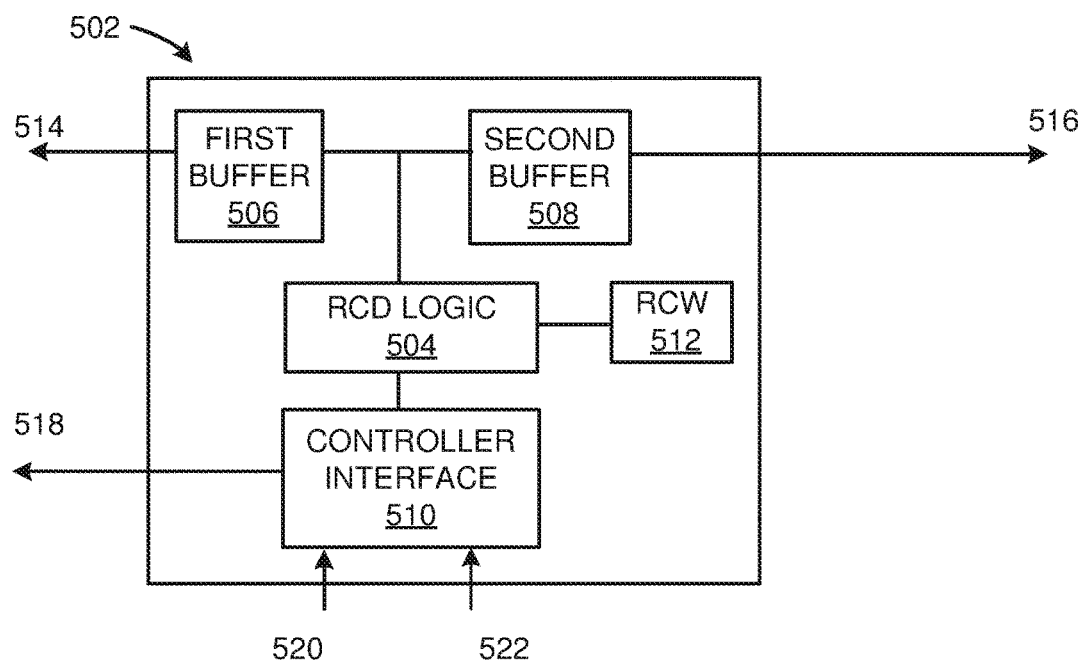
FIG. 5 depicts an example of a registering clock driver.

FIG. 5 illustrates an example of the registering clock driver 502. The registering clock driver 502 (RCD 502) can drive and buffer the data, control, command, and clock signals to drive and control the volatile memory 212.

The RCD 502 is an electronic device for interfacing with the volatile memory 212. The RCD 502 can reduce system loading by including on-board registers and data buffers to help improve operational performance. The RCD 502 can receive and retransmit the address signals to the memory chips of the volatile memory 212. The RCD 502 can effectively isolate the signals to ensure proper electrical operation.

In one embodiment, the RCD 502 can have differential clock inputs to provide the volatile memory 212, such as DDR SDRAM, with buffered address and control signals. The RCD 502 can be configured support DDR memory where the data is clocked on both the rising edge and the falling edge of the clock signal.

The RCD 502 can have a variety of configurations. In one embodiment, the RCD 502 can include a controller interface 510, a registering clock driver logic unit 504, a first buffer 506, a second buffer 508, and a registering clock driver control word 512. The registering clock driver control word 512 can be a register or other data structure having control information.

The controller interface 510 can have an RCD input 520 for receiving input data. The controller interface 510 can include a clock input 522 for receiving an external clock signal. The controller interface 510 can include a data buffer control line 518 for receiving and transmitting control information. The data buffer control line 518 can be bidirectional.

The RCD logic unit 504 can be coupled to the controller interface 510 and process the commands and signal received from an external host system. The RCD logic unit 504 can be a microprocessor, a microcontroller, a field programmable gate array (FPGA), Application Specific Integrated Circuit (ASIC), a state machine, or other similar processing device.

The RCD logic unit 504 can be controlled by the registering clock driver control word 512 (RCDCW 512). The RCDCW 512 can include the commands and settings used to control the operation of the RCD 502.

The RCD 502 can include at least two buffers, such as a first buffer 506 and a second buffer 508, can drive the signals going to the other external components, such as the volatile memory devices. The buffers can input the first output 514 and the second output 516. The first output 514 and the second output 516 can each include data signals and a clock signal. The buffers can be coupled directly to the volatile memory, such as DRAM chips, to drive the volatile memory operations. This can include data transfer and control operations.

The RCD 502 can have a variety of configurations. Although the figures show a particular configuration, it is understood that other configurations are possible. The RCD 502 can be configured with additional functional units, different numbers of output and inputs, and have different operating characteristics including different power requirements.

The buffer outputs can carry data signals and clock signals. For example, the buffers can have Q outputs from flip flops that can drive multiple devices. The clock signals can include an output clock signal such as Y_CLK. The output signals can be received by a host controller on the external host system.

In an example, The RCD 502 can be a JEDEC compliant registered clock driver. The RCD 502 can be assembled for different components or be fabricated as a separate integrated circuit.

In another example, the input signals can be Stub Series Terminated Logic (SSTL), pseudo-differential (pseudo open drain) signals using an external or internal voltage reference. The RCD input 520 can include the address/command signals from the memory bus.

The RCD 502 can send commands to the volatile memory to initiate self-refresh mode. The RCD 502 can set a flag and then receive status information to show that the volatile memory devices are in the self-refresh mode. The RCD 502 can decode the frontside bus and support asynchronous DRAM refresh (ADR).

4.0. FUNCTIONAL OVERVIEW

Figure 6:
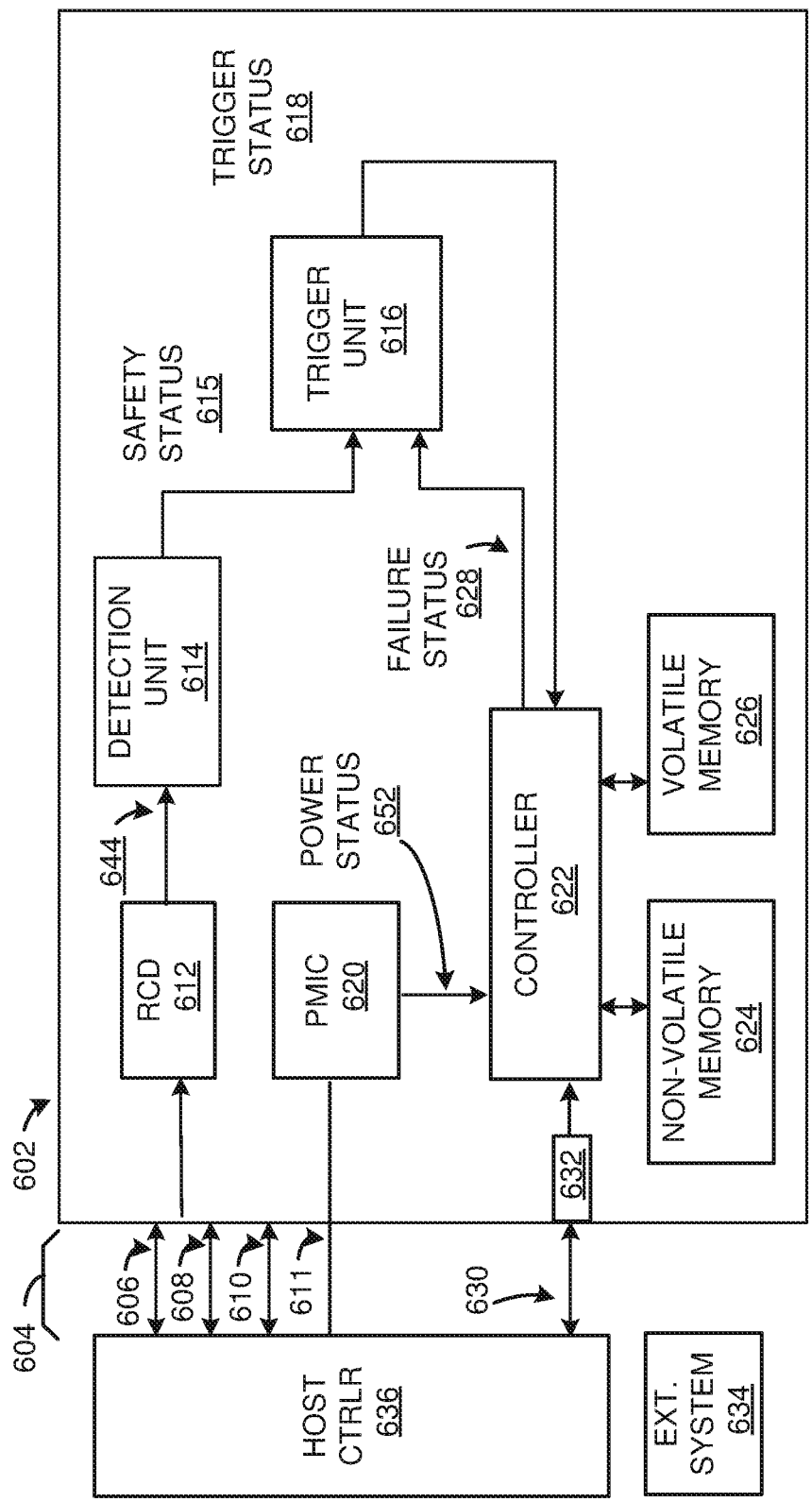
FIG. 6 depicts an example of a hybrid memory unit.

FIG. 6 illustrates an example of the hybrid memory unit 602. The hybrid memory unit 602 can be coupled to an external system 634 via a host controller 636.

The hybrid memory unit 602 is a memory that can include both volatile memory 626 and non-volatile memory 624. They hybrid memory unit 602 can provide random access memory that preserves its contents when electrical power is removed.

In an embodiment, the volatile memory 626 can be accessed directly by an external system 634 via a memory bus 604. For example, the volatile memory 626 can be byte addressable random-access memory. The non-volatile memory 624 can be a block addressable memory, such as Flash memory.

The hybrid memory unit 602 can have a variety of communication configurations. For example, the hybrid memory unit 602 can be coupled to the host controller 636 with the memory bus 604 having data lines 606, control lines 608, and signal lines 607.

The data lines 606 are links for transferring data information between the host controller 636 and the hybrid memory unit 602. The data lines 606 can include the data lines (DQ), the data strobe lines (DQS), the data mask lines (DM), and other similar links. The DQ lines are bidirectional lines to transfer the data information. The DQS lines can carry data timing information and be used to synchronize the sampling of the DQ and DM signals. The DM lines can be used to mask data bits in a burst operation.

The control lines 608 are communication lines for transferring command information between the host controller 636 and the hybrid memory unit 602. The control lines 608 can include addressing and command information.

The signal lines 607 are communication lines for transferring signal information between the host controller 636 and the hybrid memory unit 602.

The hybrid memory unit 602 can include power lines 611 for powering the hybrid memory unit 602. In some configurations, the power lines 611 can include power status and information lines.

The hybrid memory unit 602 can include a registering clock driver 612 (RCD 612). The RCD 612 can process the data inputs, address lines 609, the command lines 610, and the control lines 608 received from the host controller 636 and distribute them to the DRAM memory on the hybrid memory unit 602. row address column address of DRAM, RCD can buffer the address of the target data. The RCD 612 can receive inputs on an RCD input line 613.

The RCD 612 can buffer the signals from the host controller and distribute the signals to the memory of the hybrid memory unit 602. The RCD 612 can reduce the overall load of the hybrid memory unit 602 and preserve signal integrity. The RCD 612 is a controller on the hybrid memory unit 602 for controlling signals to the volatile memory 626. The RCD 612 can retime the signals to the volatile memory. This can include synchronizing the signals and prelaunch the address to be a half clock cycle ahead of the clock.

The RCD 612 can utilize a register control word 668 (RCW 668) to control the configuration and functionality. The host controller 636 can use the RCD 612 to configure the internal registers of the RCD 612. For example, the RCD 612 can receive a mode register 7 command. For read operations, the RCD 612 can receive the RCW command send by the host controller 636 to move the specific register configuration into a special multi-purpose register 656 (MPR 656) in the non-volatile memory. Then the data of the MPR 656 can be sent to the controller. The host controller 636 can write directly to the RCD 612 to update the register control word 668. In write operations, the write data can be sent to the RCD 612 and then to the data buffers before being written into the non-volatile memory.

The RCD 612 can determine a memory state 640 of the volatile memory 626. The memory state 640 can indicate if the DRAM memory are in a self-refresh mode 642.

The volatile memory 626 of the hybrid memory unit 602 can operating in different modes. In the case of low power modes, the volatile memory 626 can operating in a DDR PHY interface (DFI) is an interface protocol for defining the connectivity between a DDR memory controller (MC) and a DDR physical interface (PHY). The protocol defines the signals, signal relationships, and timing parameters for controlling the DDR memory.

The DRAM memory can operate in different modes. The DRAM can require being periodically refreshed to preserve the information stored in the DRAM memory cells. Memory refresh can be a background maintenance process performed by external circuitry during the normal operation of the device. The refresh process can refresh the charge in the DRAM memory cells in the DRAM and refresh the DRAM cells to preserve the data.

In an example, a self-refresh mode is a low power mode where the DRAM devices maintain the refresh internally so the MC PHY and memory interfaces can be idle and reduce power consumption. In self-refresh mode, the clock can be disabled and an internal refresh counter can be used to execute the refresh operation internally. The self-refresh mode can preserve the data in the DRAM when the data is not accessed for a period of time.

The volatile memory 626 can operate in the self-refresh mode. The self-refresh is a mode that causes the DRAM to be refreshed. The self-refresh command can indicate a row address and execute the refresh operation on that address. The self-refresh mode is a standby mode to preserve data when the clock signal is not available. The self-refresh operation can be performed at a pre-defined time interval to preserve the data.

The RCD 612 can be coupled to a self-refresh detection unit 614 that can help detect whether the volatile memory 626 is currently in the self-refresh mode 642. The self-refresh detection unit 614 is a device or circuitry that can interoperate with the RCD 612, detect the state of the volatile memory 626, and generate the self-refresh mode value 644. The self-refresh detection unit 614 can be implemented with logic circuits forming a counter, timer, logical gates, or other circuitry. In one embodiment, the self-refresh detection unit 614 can act as a simple pass though device and simply output the value received from the RCD 612. Although the RCD 612 and the detection unit 614 are shown at separate devices, it is understood that the RCD 612 and the detection unit 614 can be implemented as a single unit.

The output of the self-refresh detection unit 614 is a safety status 615, such as a self-refresh entry complete flag. The safety status 615 can show that the volatile memory 626 has successfully enter the self-refresh mode. Once the volatile memory 626 is operating in self-refresh mode, the volatile memory 626 can be successfully and safely backed up to the non-volatile memory 624.

The safety status 615 can be an input to a trigger unit 616. The trigger unit 616 is a device that can perform operations on two or more input values to generate a trigger status 618 to indicate that a catastrophic event 646 has occurred. The trigger unit 616 can generate the trigger status 618 based on comparing inputs to a trigger threshold 667, such as a power threshold 662, a timer threshold 665, a pre-defined threshold value, or other similar threshold. Comparing can be implemented as a less than or equal to operation, a great than or equal to operation, or other similar comparison.

The trigger unit 616 can have a variety of configurations. In one embodiment, the trigger unit 616 can operate as an AND gate with two inputs. The trigger unit 616 can be configured to perform different operations on the input signals including logical operations, arithmetic operations, state calculations, and other similar operations.

The hybrid memory unit 602 can include a controller 622. The controller 622 is an electronic device for managing and controlling the hybrid memory unit 602. In an embodiment, the controller 622 can be a non-volatile memory controller, a volatile memory controller, a central processing unit, a programmable controller, a field programmable gate array configured to control the memory, or a combination thereof.

The controller 622 can generate a failure status 628 to indicate that the controller 622 has detected a failure condition. The failure condition can be a precursor to a catastrophic event 646.

The controller 622 can generate the failure status 628 in a variety of ways. In one embodiment, the controller 622 can receive the fail_n signal from the host controller 636. This can indicate that the external system 634 is initiating the catastrophic event 646. For example, the failure status 628 can indicate a power failure at the host, the presence of the fail_n signal indicating a problem, or other similar events.

Although the controller 622 is shown as a single element, it is understood that other configurations are possible. For example, the controller 622 can be implemented as a volatile memory controller and a non-volatile memory controller. The controller 622 can also be configured as a microprocessor with software or firmware to perform the memory control functionality.

The controller 622 can be coupled to the non-volatile memory 624 and the volatile memory 626. The controller 622 can be configured to automatically backup the contents of the volatile memory 626 to the non-volatile memory 626 if a catastrophic event occurs The non-volatile memory 624 is memory that retains the contents even without power. For example, the non-volatile memory 624 can be Flash memory, resistive memory, phase-change memory, disk memory, charged coupled devices, or other types of persistent memory.

The volatile memory 626 is memory that loses the contents without power. For example, the volatile memory 626 can be dynamic random-access memory (DRAM), synchronous dynamic random-access memory (SDRAM), static memory, or other similar types of memory.

The hybrid memory unit 602 can include the memory bus 604 having a status pin 632. For example, the status pin 632 can represent the power good fail_n pin (PGF pin). The status pin 632 can be a bidirectional pin on the memory bus used to transfer information about the condition of power on the hybrid memory unit 602 and an external fail value 650. The status pin 632 information can include a power good status 652 and the external fail value 650 can be received from the host controller 636. In an embodiment, the power good status 652 can include a power_good signal, while the external fail value 650 can include the fail_n signal. It is understood that other configurations are possible.

The status pin 632 can piggyback two signals on one pin. The status pin 632 can represent an overloaded pin carrying both signals at different times. In some embodiment, the status pin 632 can carry the two signals in different direction with a failure signal 654, such as a FAIL_n signal going from the external system 634 to the hybrid memory unit 602 and the power_good signal going from the hybrid memory unit 602 to the external system 634.

The power status 638 can be generated by the PMIC 620 and transferred to the controller 622 and the host controller 636 of the external system 634. The power status 638 can have a value to indicate the power status. The power status 638 can indicate that the input power is good or bad, that all of the power levels on the hybrid memory unit 602 are correct and operating properly, or other similar power statuses.

The external fail value 650 can be received from the host controller 636 to indicate that the hybrid memory unit 602 has encountered a catastrophic event 646 and should initiate a shut down. This can include removing the hybrid memory unit 602 from the memory bus 604 and isolating the unit electrically.

The external fail value 650, such as a FAIL_n signal, is an input to the hybrid memory unit 602. The external fail value 650 can be transferred to the PMIC 620. The host controller 636 can use the external fail value 650 to shut down the hybrid memory unit by removing it from the memory bus 604. The host controller 636 uses this as a safeguard in case there is a problem with another memory module on the same memory channel. Because the host controller can have adjacent memory modules configured for high speed signal termination, the state of one of the memory modules can impact the adjacent memory module. If one of the memory modules on the same memory channel goes bad, then the other memory module can be taken offline as well to prevent electrical terminal issues.

The hybrid memory unit 602 can include a power management integrated circuit 620 (PMIC 620) for converting an input power to the different power and voltage levels required by the components of the hybrid memory unit 602. The PMIC 620 can also be designated a power management interface controller. The PMIC 620 is a device having electrical power regulators for changing the input voltage to different voltages.

The PMIC 620 can provide information about the input power. For example, the PMIC 620 can provide a power status 638 to indicate that the input power received is correct. If the input power is correct, then the PMIC 620 can generate the correct power levels for operating the hybrid memory unit 602.

The controller 622 can receive the power status 638 from the PMIC 620. If the controller 622 detects that the power status 638 indicates a power problem on the hybrid memory unit 602, then the controller 622 can initiate the catastrophic event action 648.

The catastrophic event action 648 can include a variety of action responses. For example, the catastrophic event action 648 can include initiating a backup from the volatile memory 626 to the non-volatile memory 624, switching input power to use an alternate power source 658, or other similar actions. The alternate power source 658 can be a backup or substitute power source such as a battery, ultra-capacitor, fuel cell, or other similar power source. The alternate power source 658 can be attached directly on the hybrid memory unit 602, attached to the hybrid memory unit 602 with a power cable, or a combination thereof.

The controller 622 can use the power status 638 to determine if the hybrid memory unit 602 is experiencing a catastrophic power event. If the power status 638 indicates that the status of the input power is bad, then the controller 622 can send a catastrophic event status 660 to one of the inputs for the trigger unit 616. The controller 622 can also send a message to the RCD 612 telling it to initiate the catastrophic event action 648. In this case, the catastrophic event action 648 would be to initiate the self-refresh mode 642 in the volatile memory 626. The RCD 612 can send the proper commands to the volatile memory 626, such as the SDRAM memory, to initiate self-refresh mode.

The hybrid memory unit 602 can have a variety of configurations. In one embodiment, the hybrid memory unit 602 can detect that a catastrophic event 646 has occurred based on the evaluation of a trigger status 618 and initiate the catastrophic event action 648.

For example, the trigger unit 616 can be configured to logically "AND" the failure status 628 and the safety status 615 to generate the trigger status 618. If both the safety status 615 and the failure status 628 are true, then the trigger status 618 is generated by the trigger unit 616 and sent to the controller 622. When the controller 622 receives the trigger status 618, then the controller 622 can initiate a backup from the volatile memory 626 to the non-volatile memory 624.

In an embodiment, the trigger status 618 can be the equivalent of the save_n pin 226. Thus, the trigger status 618 can be calculated on-board the hybrid memory unit 602 to eliminate the need for the save_n pin 226. This can help reduce the pin count on the memory bus.

The hybrid memory unit 602 can respond to different types of catastrophic events 646. For example, the catastrophic event 646 can include a power failure, a hung system, a system crash, electrical component failure, timeout, mechanical component failure, thermal failure, or other such events.

When the catastrophic event 646 occurs the trigger status 618 can result in the performance of a safety condition action 664. The safety condition action 664 can be any operation or set of operations in response to the catastrophic event 646. For example, the safety condition action 664 can be operations that need to be executed before a successful backup can be performed, performing the backup operation, adjustment of power settings, or other similar operations.

In an illustrative example, the safety condition action 664 can change the operational mode of the hybrid memory unit 602 by putting the volatile memory 626 into self-refresh mode 642. This means that the volatile memory 626, such as SDRAM, can receive a command to start operating in self-refresh mode 642 to preserve the data. Alternatively, the safety condition action 664 could include other operations as well as the commands for entering the self-refresh mode 642.

In another illustrative example, the catastrophic event 646 can include the detection of a problem in the external system 634 using a timer threshold 665 to detect a non-responsive external system 634. The timer threshold 665 is a time value used to detect a timeout. The external system 634 can regularly ping or send a signal to the hybrid memory unit 602 to show that the external system 634 is operating properly. If the controller 622 detects that the interval since the last ping or signal is greater than or equal to the timer threshold 665, then the hybrid memory unit 602 can initiate the safety condition action 664, such as a data backup operation. Using the timer threshold 665 can improve reliability and data safety.

As memory become larger, more complex, and support additional data functionality, the ability to control and communicate with the hybrid memory unit 602 becomes problematic. Limitations on the number of pins and lines available to communicate with the hybrid memory unit 602 and the host controller 636 require different ways of encoding and transferring data, commands, signals, and other information to detect the catastrophic event 646.

In an embodiment, the hybrid memory unit 602 can include the functionality to react to a loss of power from the external system 634 without using an explicit signal line on the memory bus 604 to indicate the power loss. The hybrid memory unit 602

The hybrid memory unit 602 can be a variety of different types of persistent memory devices. For example, the hybrid memory unit 602 can be an NVDIMM-F, NVDIMM-N, NVDIMM-P or other non-volatile memory types. The NVDIMM-F device is a DIMM module with Flash storage.

The NVDIMM-N device is a DIMM with flash storage and traditional DRAM on the same module. The external systems can access the traditional DRAM directly and the non-volatile memory can be used to backup the DRAM data in case of a power failure or other catastrophic event.

The NVDIMM-P device is a persistent memory with both memory mapped Flash memory and memory-mapped DRAM. The NVDIMM-P can support two access mechanisms including persistent DRAM (-N) and block-oriented drive access (-F). The NVDIMM-P devices can write directly to the DRAM space and the Flash space. In typical examples, the NVDIMM-P can have capacities from the hundreds of gigabytes to several terabytes and latencies in the hundreds of nanoseconds. In a DRAM read operation, an activate command is sent the DRAM to activate a row of DRAM memory cells. After a calm cycle, the data can appear on the pins of the DRAM device after a pre-determined number of cycles. The number of pre-determined cycles can be determined by configuring a mode register. For example, the number of pre-determined cycles can be 15. The DRAM can implement a flag-based handshake to allow the memory device to know when the data is ready.

The hybrid memory device 602 can be configured to have different bus and signal connections. In one illustrative embodiment, the hybrid memory device 602 can be configured to not include a clock enable line (CKE) and not have a SAVE_n line. This can include configurations such as DDR5 memory devices. In other devices, the CKE line can be used to control clock related functionality of the hybrid memory device 602 as well as act as an indicator of the self-refresh mode. The CKE line can provide information including how the clock signal is utilized and interpreted, indicating which clock edge is used for performing actions, and other similar actions.

In some configurations, when the CKE line is not available, the CKE equivalent commands can be sent over a serial interface line 630. The serial interface line 630 can be configured as a pin on the memory bus, a control line, a signal line, or other similar configuration. The controller 622 can interface with the host controller 636 to provide commands such as a stop clock command, enter self-refresh mode command, or other similar commands. Thus, when the stop clock command is received, the hybrid memory unit 302 can act as if the clock has been stopped. In another example, a CKE command to initiate the self-refresh mode can cause the hybrid memory unit 602 to enter the self-refresh mode.

In another embodiment, the RCD 612 can provide support for the asynchronous DRAM refresh (ADR) mode. The ADR can trigger a hardware interrupt to the controller 622 which can then flush the write-protected data buffers and place the DRAM in self-refresh mode. The ADR can be trigger as part of the catastrophic event action 648 and be performed before a backup operation to insure data consistency.

In yet another embodiment, the hybrid memory unit 502 can support different catastrophic trigger techniques. The hybrid memory unit 502 can implement a backup upon receiving the equivalent of the RESET_n signal or the SAVE_n signals.

Figure 7:
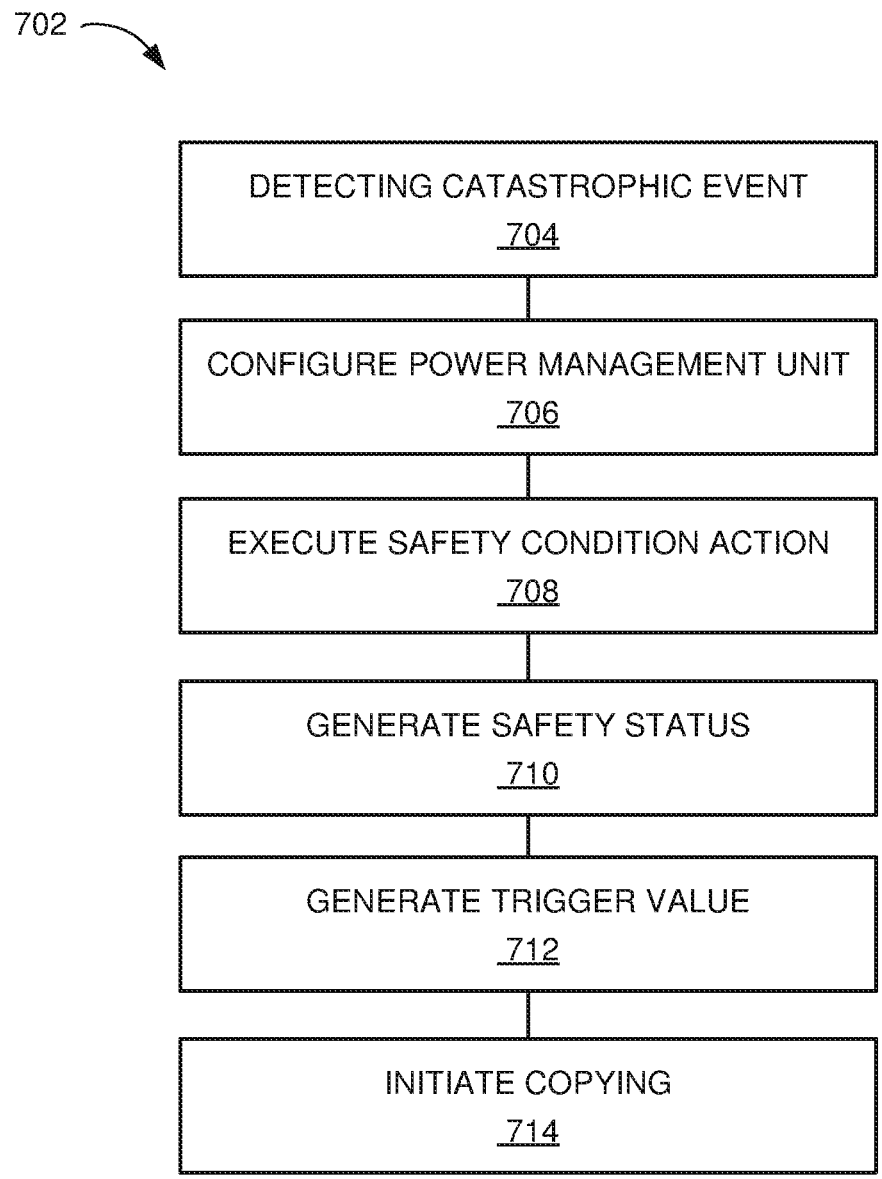
FIG. 7 depicts an example of an operation process flow.

FIG. 7 illustrates an example of an operating process flow 702. The operating process flow 702 shows the process of operating the hybrid memory unit 602 to detect and respond to a catastrophic event.

The operating process flow 702 can operate in a variety of ways. For example, the operating process flow 702 can include the detecting catastrophic event step 704, the configure power management unit step 706, the execute safety condition action step 708, the generate safety action step 710, the generate trigger status step 712, and the initiate copying step 714.

In the detecting catastrophic event step 704, the hybrid memory unit 602 can detect the occurrence of the catastrophic event 646 at the external system 634. The catastrophic event 646 can include events such as a power failure, receiving a failure signal, a hung system, hardware failure, or other similar events. The catastrophic event 646 can prevent the external system 634 from operating correctly.

The controller 622 can detect the catastrophic event 646 in several ways. The controller 622 can detect a power failure by communicating with the power management unit 620, such as a power management integrated circuit (PMIC), and receiving the power status 638.

The power status 638 can indicate whether the power lines 611 are providing input power as needed. If one or more of the power lines 611 shows the effects of a power failure and does not delivery the proper power levels to the PMIC 620, then the PMIC 620 can generate the power status 638 to show that the power has failed. The power status 638 can be sent to the controller 622.

The controller 622 can validate that the power status 638 by comparing value of the power status 638 to a power threshold 662 and if the value of the power status 638 is greater than or equal to the power threshold 662, then the external system 634 is experiencing a power failure. When the power failure is detected, the controller 622 can send the failure status 628 to the trigger unit 616 for further processing.

The controller 622 can detect the catastrophic event 646 where the failure signal 654 has been received from the external system 634. This can be the case where the external system 634 has determined that there is a problem and instructs the hybrid memory unit 602 of a hung or inoperable system at the external system 634.

In an illustrative example, the failure signal 654, such as the assertion of the FAIL_n signal on the memory bus, can indicate that the external system 634 has encountered a problem and needs to shutdown. If the external system 634 was a network routing system, then the system may need to shutdown for maintenance, but still wants to preserve the routing information stored in the volatile memory. In this case the external system 634 can instruct the hybrid memory unit 602 to save the state of the volatile memory in the non-volatile memory.

The controller 622 can receive the failure signal 654 from the external system 634 over the status pin 632. When the failure signal 654 is received, then the controller 622 can send the failure status 628 to the trigger unit 616 to indicate the need to initiate the backup.

When the detecting catastrophic event step 704 is complete, the control flow can pass to the configure power management unit step 706. The control flow passes sequentially to the next step unless otherwise indicated.

The configure power management unit step 706 can switch the operating power of the hybrid memory unit 602 from the primary power pin to the alternate power source 658. When the catastrophic event 646 is detected, the power management unit 620 can switch the source of power to the alternate power source 658 to allow the hybrid memory unit 602 to continue operating long enough to backup the volatile memory 626 to the non-volatile memory 624.

The execute safety condition action step 708 can perform the safety condition action 664 to prepare the hybrid memory unit 602 for the backup of the volatile memory 626 to the non-volatile. The safety condition action 664 can be any operation or set of operations that need to be executed before a successful backup can be performed.

In an illustrative example, the safety condition action 664 can be the operation of putting the volatile memory 626 into self-refresh mode 642. This means that the volatile memory 626, such as SDRAM, can receive a command to start operating in self-refresh mode 642. Alternatively, the safety condition action 664 could include other operations as well as the commands for entering the self-refresh mode 642.

The generate safety action step 710 can generate a safety status 615 based on the result of the safety condition action 664. After the safety condition action 664 executes, the outcome status can be assigned to the safety status 615 and transferred to the trigger unit 616 to be used as an input.

If the safety condition action 664 configures the volatile memory 626 to enter the self-refresh mode 642, then the generate safety action step 710 can be generated when the volatile memory 626 has completed flushing the buffers and is operating in the self-refresh mode 642. The generate safety action step 710 can be generating in a variety of ways including detecting the self-refresh state, exceeding the timer threshold 665, or other similar techniques. For example, the hybrid memory unit 602 can reset the timer threshold 665 after receiving a valid signal from the external system 634. If the external system 634 hangs or otherwise become non-responsive, then the timer threshold 665 can expire and initiate the safety condition action 664, such as a backup of the volatile memory 626 to the non-volatile memory 624, to protect and preserve the data.

The generate trigger status step 712 can generate the trigger status 618 that indicates that the hybrid memory unit 602 should initiate the backup process to preserve the data in the volatile memory 626. The safety status 615 and the failure status 628 can both be inputs to the trigger unit 616. The trigger unit 616 can compare the two values and when both statuses match, then the trigger status 618 can be generated and sent to the controller 622. Alternatively, The failure status 628 indicates that the controller 622 has detected a condition that requires the backing up of the volatile memory 626 to the non-volatile memory 624. This can include receiving an express failure signal from the external system 634, detecting the power failure by receiving the power status 638 from the power management unit 620, or other similar situations.

The safety status 615 is a value generated by the RCD 612 that indicates that the volatile memory 626, such as SDRAM, is operating in self-refresh mode 642. The RCD 612 can receive be triggered by the controller 622 and the failure status 628 to initiate the process of entering the self-refresh mode 642.

The initiate copying step 714 can cause the controller 622 to copy at least a portion of the volatile memory 626 to the non-volatile memory 624. When the trigger status 618 is received by the controller 622, the controller 622 can identify the portion of the volatile memory 626 that need to be backed up begin transferring the contents to the non-volatile memory 624.

In one embodiment, the hybrid memory unit 602 can include an encryption unit, such as the encryption engine 214, to encrypt and decrypt data. The controller 622 can use the encryption unit to provide for a secure backup. The controller 622 can transfer portions of the volatile memory to the non-volatile memory.

Other examples of these and other embodiments are found throughout this disclosure.

5.0. EXAMPLE EMBODIMENTS

Examples of some embodiments are represented, without limitation, in the following clauses and use cases:

According to an embodiment, a method of operation of a hybrid memory unit comprises detecting a catastrophic event on an external host system, upon detecting the catastrophic event, configuring a power management unit of the hybrid memory unit to receive power from an alternate power source, executing a safety condition action for a volatile memory of the hybrid memory unit, generating a safety status based on the completion of the safety condition action, and generating a trigger status by combining the safety status and a failure status from the external host system at a trigger unit, and in response to the trigger status being greater than or equal to a trigger threshold, copying at least a portion of the contents of a volatile memory to a non-volatile memory.

In an embodiment, the method further comprises detecting the catastrophic event includes detecting a power error at a power management unit.

In an embodiment, the method further comprises initiating the safety condition action includes initiating a self-refresh mode for the volatile memory.

In an embodiment, the method further comprises detecting the catastrophic event includes detecting a non-operational mode of the external host system.

In an embodiment, the method further comprises initiating the safety condition action includes electrically isolating the hybrid memory unit from the external host system.

According to an embodiment, a method of operation of a hybrid memory unit comprises detecting a power loss at an external host system, upon detecting the power loss, switching a power management unit to receive power from an alternate power source, initiating a self-refresh mode for the volatile memory of the hybrid memory unit, generating a safety status indicating the volatile memory is in self-refresh mode, generating a trigger status by detecting both a successful completion of the safety condition action and a failure status from the external host system at a trigger unit, copying at least a portion of the contents of a volatile memory to a non-volatile memory, and restoring the non-volatile memory to the volatile memory.

In an embodiment, the method further comprises detecting the catastrophic event includes receiving a failure flag from the external host system on a status pin.

In an embodiment, the method further comprises detecting the catastrophic event includes detecting a failure of a primary power line at the power management unit.

In an embodiment, the method further comprises receiving a primary power line input at a power management unit directly on the hybrid memory unit, and generating a volatile memory operating voltage and non-volatile memory operating voltage at the power management unit using the primary power line input.

In an embodiment, the method further comprises initiating the safety condition action includes initiating the safety condition action based on receiving the failure status at the registering clock driver.

A hybrid memory unit comprises a memory board having a memory bus for coupling to an external system, a volatile memory coupled to a non-volatile memory, the volatile memory and the non-volatile memory on the memory board, a status pin on the memory bus of the memory board, the status pin configured to carry a system status from the external system, a controller on the memory board for controlling the volatile memory and the non-volatile memory, the controller configured to detect the system status from the status pin, a registering clock driver device on the memory board, the registering clock driver configured to determine a volatile memory state, execute a safety condition action for the volatile memory, and generate a safety status based on the completion of the safety condition action, a power management unit on the memory board, the power management unit coupled to a primary power pin and configured to switch to an alternate power source upon detection of the catastrophic event, a trigger unit coupled to both the registering clock driver device and the controller, the trigger unit configured to combine the safety status and the failure status to generate the trigger status, and a controller directly on the memory board, the controller coupled to the power management unit and the registering clock driver, and the controller configured to detect the catastrophic event on the external system, generate the failure status, receive the trigger status from the trigger unit, and the controller further configured to initiate copying of at least a portion of the volatile memory to the non-volatile memory in response to the trigger status being greater than or equal to a trigger threshold.

In an embodiment, the method further comprises the power management unit is configured for detecting a power error at a power management unit.

In an embodiment, the method further comprises registering clock driver is configured for initiating a self-refresh mode for the volatile memory.

In an embodiment, the method further comprises the controller is configured for detecting the catastrophic event by detecting a non-operational mode of the external host system.

In an embodiment, the method further comprises the power management unit is configured for electrically isolating the hybrid memory unit from the external host system.

In an embodiment, the method further comprises the controller is configured for detecting the catastrophic event including a power loss, and the registering clock driver is configured for initiating a self-refresh mode for the volatile memory and generating the safety status indicating the volatile memory is in self-refresh mode.

In an embodiment, the method further comprises the controller is configured for detecting the catastrophic event by receiving a failure flag from the external host system on the status pin.

In an embodiment, the method further comprises the power management unit is configured for detecting a failure of a primary power line.

In an embodiment, the method further comprises the power management unit is configured for receiving a primary power line input at a power management unit directly on the hybrid memory unit and generating a volatile memory operating voltage and non-volatile memory operating voltage at the power management unit using the primary power line input.

In an embodiment, the method further comprises the registering clock driver is configured for initiating the safety condition action based on receiving the failure status at the registering clock driver.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is understood that the system functionality can be described using terms like module, unit, system, subsystem, and component that represent devices that can be implemented using different combinations of hardware, firmware, and software elements. The devices can include electric subsystems, optical subsystems, mechanical subsystems, and other physical elements. These elements can include computing elements that can execute the firmware and software of the system.

What is claimed is:

1. A method of operation of a hybrid memory unit comprising a non-volatile memory and a volatile memory, the method comprising:
   detecting a catastrophic event on an external host computing system that is operably connected to the hybrid memory unit;
   upon detecting the catastrophic event, receiving power from an alternate power source;
   executing a safety condition action for the volatile memory of the hybrid memory unit, wherein executing the safety condition action comprises initiating the safety condition action based on receiving a failure status at a registering clock driver of the hybrid memory unit;
   generating a safety status based on completion of the safety condition action;
   generating a trigger status based on the safety status indicating a completion of the safety condition action and a failure status indicating the detecting of the catastrophic event, and
   based on generating the trigger status, copying at least a portion of the contents of the volatile memory to the non-volatile memory.

2. The method as claimed in claim 1 wherein detecting the catastrophic event includes detecting a power error at a power management unit in the hybrid memory unit.

3. The method as claimed in claim 1 wherein initiating the safety condition action includes initiating a self-refresh mode in the volatile memory.

4. The method as claimed in claim 1 wherein detecting the catastrophic event includes detecting a non-operational mode of the external host computing system.

5. The method as claimed in claim 1 wherein initiating the safety condition action includes electrically isolating the hybrid memory unit from the external host computing system.

6. A method of operation of a hybrid memory unit comprising a volatile memory and a non-volatile memory, the method comprising:
   detecting a power loss at an external host computing system operably connected to the hybrid memory unit;
   upon detecting the power loss, receiving power from an alternate power source;
   initiating a self-refresh mode for the volatile memory of the hybrid memory unit;
   generating a safety status indicating the volatile memory is in self-refresh mode;
   generating a trigger status by detecting both a successful completion of a safety condition action and a failure status from the external host computing system, wherein the safety condition action is initiated based on receiving the failure status at a registering clock driver of the hybrid memory unit;
   in response to generating the trigger status, copying at least a portion of the contents of the volatile memory to the non-volatile memory; and
   restoring the at least the portion of the contents copied to the non-volatile memory to the volatile memory.

7. The method as claimed in claim 6 wherein detecting the catastrophic event includes receiving a failure flag from the external host computing system on a status pin.

8. The method as claimed in claim 6 wherein detecting the catastrophic event includes detecting a failure of a primary power line in the hybrid memory unit.

9. The method as claimed in claim 6 further comprising:
   receiving, by the hybrid memory unit, a primary power line input; and
   generating a volatile memory operating voltage and non-volatile memory operating voltage using the primary power line input.

10. A hybrid memory unit, comprising:
    a memory board having a memory bus for coupling to an external computing system;
    a volatile memory coupled to a non-volatile memory, the volatile memory and the non-volatile memory on the memory board;
    a status pin on the memory bus of the memory board, the status pin configured to carry a system status from the external computing system;
    a first controller on the memory board for controlling the volatile memory and the non-volatile memory, the first controller configured to detect the system status from the status pin;
    a registering clock driver device on the memory board, the registering clock driver device configured to:
      determine a volatile memory state;
      execute a safety condition action for the volatile memory; and
      generate a safety status based on the completion of the safety condition action;
    a power management unit on the memory board, the power management unit coupled to a primary power pin and configured to switch to an alternate power source upon detection of a catastrophic event;
    a trigger unit coupled to both the registering clock driver device and the first controller, the trigger unit configured to generate a trigger status based on the safety status indicating the completion of the safety condition action and a failure status indicating a backup operation of the volatile memory should be performed; and
    a second controller on the memory board, the second controller coupled to the power management unit and the registering clock driver, the second controller configured to:
      detect the catastrophic event on the external computing system;
      generate the failure status;
      receive the trigger status from the trigger unit; and
      based on the trigger unit generating the trigger status, initiate copying of at least a portion of the volatile memory to the non-volatile memory.

11. The system as claimed in claim 10 wherein the power management unit is configured to detect a power error at the power management unit.

12. The system as claimed in claim 10 wherein the safety condition action for the volatile memory includes an initiation of a self-refresh mode for the volatile memory.

13. The system as claimed in claim 10 wherein the second controller is configured to detect the catastrophic event by detecting a non-operational mode of the external computing system.

14. The system as claimed in claim 10 wherein the safety condition action for the volatile memory includes electrically isolating the hybrid memory unit from the external computing system.

15. The system as claimed in claim 10 wherein:
    the catastrophic event is a power loss;
    the safety condition action for the volatile memory is a self-refresh mode for the volatile memory; and
    the safety status indicates the volatile memory is in the self-refresh mode.

16. The system as claimed in claim 15 wherein the second controller is configured to detect the catastrophic event by receiving a failure flag from the external computing system on the status pin.

17. The system as claimed in claim 15 wherein the catastrophic event is a failure of a primary power line.

18. The system as claimed in claim 15 wherein the power management unit is configured to:
   receive a primary power line input; and
   generate a volatile memory operating voltage and non-volatile memory operating voltage using the primary power line input.

19. The system as claimed in claim 15 wherein the registering clock driver is configured to initiate the safety condition action based on receiving the failure status.

* * * * *

UNITED STATES PATENT AND TRADEMARK OFFICE
CERTIFICATE OF CORRECTION

PATENT NO. : 11,561,739 B1
APPLICATION NO. : 16/889729
DATED : January 24, 2023
INVENTOR(S) : Kelvin Alberto Marino It is certified that error appears in the above-identified patent and that said Letters Patent is hereby corrected as shown below:

In the Specification

Column 8, Line 54, replace "a load reduced MINIM (LR-DIMM)" with --a load reduced DIMM (LR-DIMM)--.
Column 10, Line 10, replace "The second register, such as CSAVE_FAIL_INF01" with --The second register, such as CSAVE_FAIL_INFO1--.

Signed and Sealed this
Twenty-eighth Day of March, 2023

Katherine Kelly Vidal
*Director of the United States Patent and Trademark Office*